(12) United States Patent
Harale et al.

(10) Patent No.: US 10,829,371 B1
(45) Date of Patent: Nov. 10, 2020

(54) SYSTEMS AND PROCESSES FOR PRODUCING HYDROGEN FROM SOUR GASES

(71) Applicant: Saudi Arabian Oil Company, Dhahran (SA)

(72) Inventors: Aadesh Harale, Dhahran (SA); Mourad Younes, Dhahran (SA); Maytham Musawi, Dhahran (SA); Aqil Jamal, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/593,774

(22) Filed: Oct. 4, 2019

(51) Int. Cl.
*C01B 3/04* (2006.01)
*C01B 3/38* (2006.01)
*C01F 11/46* (2006.01)

(52) U.S. Cl.
CPC ............... *C01B 3/04* (2013.01); *C01B 3/38* (2013.01); *C01F 11/46* (2013.01); *C01B 2203/0283* (2013.01); *C01B 2203/0485* (2013.01); *C01B 2203/0811* (2013.01); *C01B 2203/14* (2013.01)

(58) Field of Classification Search
CPC .. C01B 3/34; C01B 3/344; C01B 3/32; C01B 3/12; C01B 32/40; C01B 32/50; C01B 17/43; C01B 17/506; F23C 10/00; F23J 15/00; F23J 15/02; F23J 7/00; C01F 11/46; B01D 53/52
See application file for complete search history.

(56) References Cited

U.S. PATENT DOCUMENTS

| | | | |
|---|---|---|---|
| 6,797,253 B2 | 9/2004 | Lyon | |
| 7,682,597 B2 | 3/2010 | Blumenfeld et al. | |
| 8,110,012 B2 | 2/2012 | Chiu et al. | |
| 8,496,909 B2 | 7/2013 | Ramkumar et al. | |
| 9,481,573 B2 | 11/2016 | Vakil et al. | |
| 9,810,146 B2 | 11/2017 | Hoteit et al. | |
| 2008/0087863 A1 | 4/2008 | Fisciier et al. | |
| 2009/0259080 A1* | 10/2009 | Raman | C10J 3/00 585/3 |
| 2009/0263316 A1 | 10/2009 | Iyer et al. | |
| 2011/0200520 A1 | 8/2011 | Ramkumar et al. | |

FOREIGN PATENT DOCUMENTS

| | | |
|---|---|---|
| CN | 101362587 A | 2/2009 |
| CN | 103552983 A | 2/2014 |
| EP | 1648817 A1 | 4/2006 |
| EP | 1914197 A1 | 4/2008 |
| EP | 2610216 A1 | 7/2013 |
| RU | 02258029 C2 | 10/2005 |
| WO | 2014053587 A1 | 4/2014 |

* cited by examiner

*Primary Examiner* — Timothy C Vanoy
(74) *Attorney, Agent, or Firm* — Leason Ellis LLP

(57) ABSTRACT

The present application discloses systems and methods for producing hydrogen from sour gas feeds. The systems and methods include systems and methods for steam reforming sour gas to produce hydrogen and calcium looping systems and methods for producing hydrogen from sour gas. In the present systems and methods, a calcination reactor decomposes calcium carbonate to form a calcium oxide and carbon dioxide. In a fuel reactor, sour gas is reacted with the calcium oxide to product syngas and calcium sulfide. An air reactor oxidizes the calcium sulfide to form an oxygen lean air stream and calcium sulfate. A water gas shift reaction stage converts the syngas into a shifted syngas. A separation stage purifies the shifted synthesis gas stream to form a hydrogen product stream.

39 Claims, 5 Drawing Sheets

SYSTEMS AND PROCESSES FOR PRODUCING HYDROGEN FROM SOUR GASES

TECHNICAL FIELD

Figure 1:
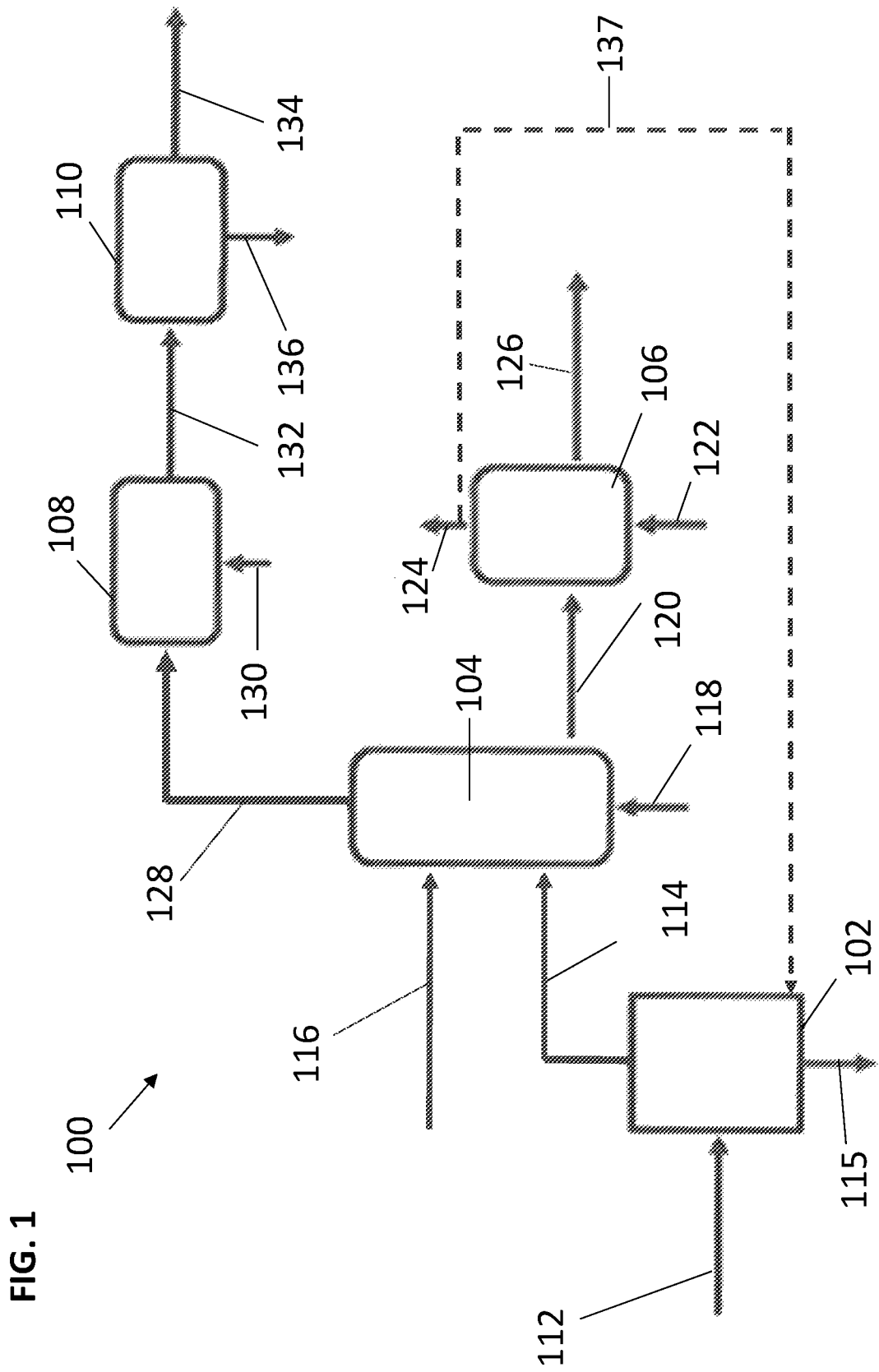

The present disclosure is generally related to hydrogen production and more particularly related to systems and processes for producing hydrogen from sour gas feeds.

BACKGROUND OF THE DISCLOSURE

Steam reforming of natural gas is an established approach for industrial-scale hydrogen production. In a conventional application, natural gas is reformed with steam in the presence of a catalyst to form synthesis gas (syngas), which is composed mainly of hydrogen ($H_2$) and carbon monoxide (CO). The reforming reaction generally proceeds according to the following reaction.

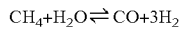

Natural gas is generally treated for any impurities, like hydrogen sulfide ($H_2S$), before the reforming step because typical steam reforming catalysts have a low tolerance for sulfur. The reforming reaction is endothermic, and energy is generally provided through means of combustion of natural gas. The process is carried out at high temperatures to obtain practical reaction rates. The produced synthesis gas is further processed to produce carbon dioxide ($CO_2$) and $H_2$ as shown in the reaction below.

Pure $H_2$ is obtained out of this mixture through separation of $CO_2$ and $H_2$.

As natural gas reserves have become more and more sour, the costs associated with $H_2S$ removal from the natural gas have increased. Further, considering the increasing worldwide demand for energy, the decreased availability of certain natural resources, and the challenges associated with climate change, the need to reduce $CO_2$ emissions in natural gas processing facilities has also increased.

Conventionally, sour gases are treated before steam reforming as the presence of sulfur damages the catalyst used in the process. For example, physical and chemical absorption integrated with a Claus process is often used to sweeten the sour gas while capturing sulfur in elemental form. However, integration of sweetening processes is demanding in terms of capital and operating costs. Further, as environmental regulations have become more stringent with regards to sulfur dioxide ($SO_2$) emissions, tail gas treatments, such as Shell Claus Off-gas Treatment (SCOT) units, are also integrated into the sour gas treatment process, adding to the complexity and costs of the process.

The present application addresses these and other challenges related to related to hydrogen production from sour gases.

SUMMARY OF THE DISCLOSURE

The present application discloses systems and methods for producing hydrogen from sour gas feeds. The systems and methods include systems and methods for steam reforming sour gas to produce hydrogen and calcium looping systems and methods for producing hydrogen from sour gas.

In a first aspect, a method for steam reforming of sour gas for hydrogen production is provided. In the method, a calcium carbonate feed is decomposed in a calcination reactor to form calcium oxide and carbon dioxide. The calcium oxide is separated from the carbon dioxide via a first separation device. The calcium oxide, a sour gas stream, and steam are conveyed into a fuel reactor, where hydrocarbons present in the sour gas stream are reformed into synthesis gas and the calcium oxide reacts with hydrogen sulfide present in the sour gas stream to form calcium sulfide and water vapor. The calcium sulfide is separated from the water vapor via a second separation device. The calcium sulfide is conveyed to an air reactor, and the calcium sulfide is oxidized in the air reactor to produce an oxygen lean air stream and calcium sulfate. The synthesis gas is passed to a water gas shift reaction stage, where at least a portion of the synthesis gas is converted to a shifted synthesis gas stream. The shifted synthesis gas stream is purified to produce a hydrogen product stream and a waste gas stream.

In another aspect, the calcination reactor is operated at a temperature greater than 850° C. In another aspect, the fuel reactor is operated in a temperature range of approximately 550° C. to 900° C. In another aspect, the air reactor is operated in a temperature range of approximately 650° C. and 1400° C.

In another aspect, the water gas shift reaction stage comprises two in-series adiabatic reactors with pre-stage and inter-stage cooling, and wherein the in-series adiabatic reactors are operated in a temperature range of approximately 150° C. to 400° C.

In another aspect, the waste gas stream comprises unreacted hydrocarbons, carbon dioxide, and hydrogen. In a further aspect, at least one of i) a portion of the waste gas stream, ii) a portion of the synthesis gas stream, and iii) a portion of the shifted synthesis gas stream is combusted in one or more combustion chambers, where heat produced by the one or more combustion chambers is used to heat at least one of the calcium carbonate feed and the sour gas stream prior to entering the calcination reactor and the fuel reactor, respectively.

In another aspect, the waste gas stream is passed to a gas processing unit, where carbon dioxide present in the waste gas stream is removed.

In another aspect, the oxygen lean air stream is conveyed to the calcination reactor, where the lean air stream enhances decomposition of the calcium carbonate.

In a second aspect, a system for steam reforming sour gas for hydrogen production is provided. The system includes a calcination reactor that is configured to decompose calcium carbonate to form a calcium oxide stream and a carbon dioxide stream. The system also includes a first separation device in fluid communication with the calcination device, and the first separation device is configured to separate the calcium oxide stream from the carbon dioxide stream. The system further includes a fuel reactor in fluid connection with the calcination reactor and into which sour gas and the calcium oxide stream are received. The fuel reactor is configured to reform hydrocarbons present in the sour gas into a synthesis gas stream and to react the calcium oxide stream with hydrogen sulfide present in the sour gas to form calcium sulfide and water vapor. The system also includes a second separation device in fluid communication with the fuel reactor, the second separation device being configured to separate the calcium sulfide from the water vapor. The system further includes an air reactor in fluid communication with the fuel reactor and into which calcium sulfide and an air stream are introduced. The air reactor is configured to oxidize the calcium sulfide via a reaction with the air stream to form an oxygen lean air stream and calcium sulfate. The system includes a water gas shift reaction stage in fluid communication with the fuel reactor and into which the synthesis gas stream and steam are introduced. The water gas shift reaction stage is configured to convert at least a portion of the synthesis gas stream into a shifted synthesis gas stream. The system also includes a separation stage in fluid communication with the shift reaction stage and into which the shifted synthesis gas stream is introduced. The separation stage is configured to purify the shifted synthesis gas stream to form a hydrogen product stream and a waste gas stream.

In another aspect, the calcination reactor is operated at a temperature greater than 850° C. In another aspect, the water gas shift reaction stage comprises two in-series adiabatic reactors with pre-stage and inter-stage cooling, and the in-series adiabatic reactors are operated in a temperature range of approximately 150° C. to approximately 400° C. In another aspect, the fuel reactor is operated in a temperature range of approximately 550° C. to 900° C. In another aspect, the air reactor is operated in a temperature range of approximately 650° C. and 1400° C.

In another aspect, the system further includes one or more combustion chambers in fluid communication with the water gas shift reaction stage and the separation stage. The one or more combustion chambers are configured to combust at least one of i) a portion of the waste gas stream, ii) a portion of the synthesis gas stream, and iii) a portion of the shifted synthesis gas stream and to transfer heat to at least one of the calcination reactor and the fuel reactor.

In another aspect, the further includes a gas processing unit in fluid communication with the separation stage, and into which the waste gas stream is introduced. The gas processing unit is configured to remove carbon dioxide from the waste gas stream.

In another aspect, the calcination reactor is in fluid communication with the air reactor and configured to receive the oxygen lean air stream from the air reactor.

In a third aspect, a calcium looping method for producing hydrogen from sour gas, is provided. In the method, a calcium carbonate feed is decomposed in a calcination reactor to form calcium oxide and carbon dioxide. The calcium oxide is separated from the carbon dioxide via a first separation device. The calcium oxide, a sour gas stream, and a stream of calcium sulfate are conveyed into a fuel reactor, where hydrocarbons present in the sour gas stream are oxidized by the stream of calcium sulfate to form synthesis gas and the calcium oxide reacts with hydrogen sulfide present in the sour gas stream to form calcium sulfide and water vapor. The calcium sulfide is separated from the water vapor via a second separation device. The calcium sulfide is conveyed to an air reactor, and the calcium sulfide is oxidized in the air reactor to produce an oxygen lean air stream and a calcium sulfate stream. At least a portion of the calcium sulfate stream formed in the air reactor is introduced into the fuel reactor. The synthesis gas is passed to a water gas shift reaction stage, where at least a portion of the synthesis gas is converted to a shifted synthesis gas stream. The shifted synthesis gas stream is purified to produce a hydrogen product stream and a waste gas stream.

In another aspect, the calcination reactor is operated at a temperature greater than 850° C. In another aspect, the water gas shift reaction stage comprises two in-series adiabatic reactors with pre-stage and inter-stage cooling, and the in-series adiabatic reactors are operated in a temperature range of approximately 150° C. to approximately 400° C. In another aspect, the fuel reactor is operated in a temperature range of approximately 600° C. to 1300° C. In another aspect, the air reactor is operated in a temperature range of approximately 650° C. and 1400° C.

In another aspect, the waste gas stream comprises unreacted hydrocarbons, carbon dioxide, and hydrogen.

In another aspect, at least one of i) a portion of the waste gas stream, ii) a portion of the synthesis gas stream, iii) a portion of the shifted synthesis gas stream, and iv) a portion of the hydrogen product stream are combusted in one or more combustion chambers, where heat produced by the one or more combustion chambers is used to heat at least one of the calcium carbonate feed and the sour gas stream prior to entering the calcination reactor and the fuel reactor, respectively.

In another aspect, the waste gas stream is passed to a gas processing unit, where a carbon dioxide stream is removed from the waste gas stream. In another aspect, the calcination reactor is heated via a thermal linkage, wherein the thermal linkage recovers energy from the oxygen lean air stream and transfers the energy to the calcination reactor. In a further aspect, the thermal linkage comprises a heat exchanger. In another aspect, the oxygen lean air stream is conveyed to the calcination reactor, where the lean air stream enhances decomposition of the calcium carbonate.

In a fourth aspect, a calcium looping system for producing hydrogen from sour gas is provided. The system includes a calcination reactor configured to decompose calcium carbonate to form a calcium oxide stream and a carbon dioxide stream. The system also includes a first separation device in fluid communication with the calcination device. The first separation device is configured to separate the calcium oxide stream from the carbon dioxide stream. The system includes a fuel reactor in fluid connection the calcination reactor, and into which sour gas, calcium sulfate, and the calcium oxide stream are received. In the fuel reactor, hydrocarbons present in the sour gas are oxidized by the calcium sulfate to form a synthesis gas stream and the calcium oxide reacts with hydrogen sulfide present in the sour gas to form calcium sulfide and water vapor. The system further includes a second separation device in fluid communication with the fuel reactor. The second separation device is configured to separate the calcium sulfide from the water vapor. The system also includes an air reactor in fluid communication with the fuel reactor, and into which calcium sulfide and an air stream are introduced. The air reactor is configured to oxidize the calcium sulfide via a reaction with the air stream to form an oxygen lean air stream and a calcium sulfate stream. The system includes a water gas shift reaction stage in fluid communication with the fuel reactor and into which the synthesis gas stream and steam are introduced. The water gas shift reaction stage is configured to convert at least a portion of the synthesis gas stream into a shifted synthesis gas stream via a catalytic water gas shift conversion. The system also includes a separation stage in fluid communication with the water gas shift reaction stage and into which the shifted synthesis gas stream is introduced. The separation stage is configured to purify the shifted synthesis gas stream to form a hydrogen product stream and a waste gas stream.

In another aspect, the system further includes a conduit in fluid communication with the air reactor and the fuel reactor, where the conduit is configured to receive a portion of the calcium sulfate stream and introduce the portion of the calcium sulfate stream into the fuel reactor.

In another aspect, the calcination reactor is operated at a temperature greater than 850° C. In another aspect, the water gas shift reaction stage comprises two in-series adiabatic reactors with pre-stage and inter-stage cooling, and the in-series adiabatic reactors are operated in a temperature range of approximately 150° C. to approximately 400° C.

In another aspect, the system further includes one or more combustion chambers in fluid communication with the shift reaction stage and the separation stage. The one or more combustion chambers are configured to combust at least one of i) a portion of the waste gas stream, ii) a portion of the synthesis gas stream, iii) a portion of the shifted synthesis gas stream, and iv) a portion of the hydrogen product stream, and to transfer heat to at least one of the calcination reactor and the fuel reactor.

In another aspect, the system further includes a gas processing unit in fluid communication with the separation stage, and into which the waste gas stream is introduced. The gas processing unit is configured to remove carbon dioxide from the waste gas stream.

In another aspect, the system further includes a thermal linkage operatively connected to the calcination reactor, where the thermal linkage is configured to recover energy from the oxygen lean air stream and transfer the energy to the calcination reactor. In a further aspect, the thermal linkage comprises a heat exchanger.

In another aspect, the calcination reactor is in fluid communication with the air reactor and configured to receive the oxygen lean air stream from the air reactor. In another aspect, the fuel reactor is operated in a temperature range of approximately 600° C. to 1300° C. In another aspect, the air reactor is operated in a temperature range of approximately 650° C. and 1400° C.

BRIEF DESCRIPTION OF THE DRAWING FIGURES

Figure 2:
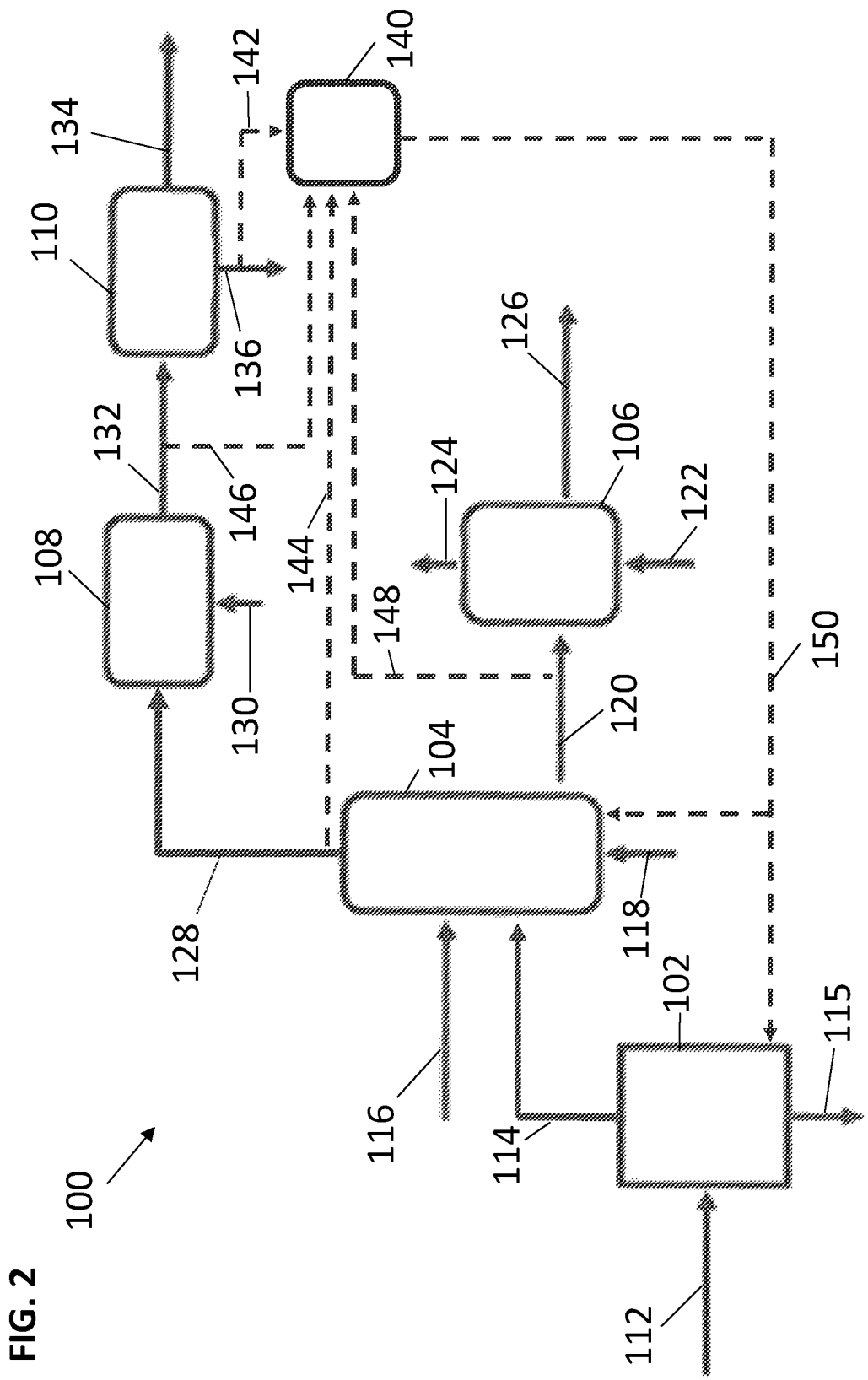
Figure 3:
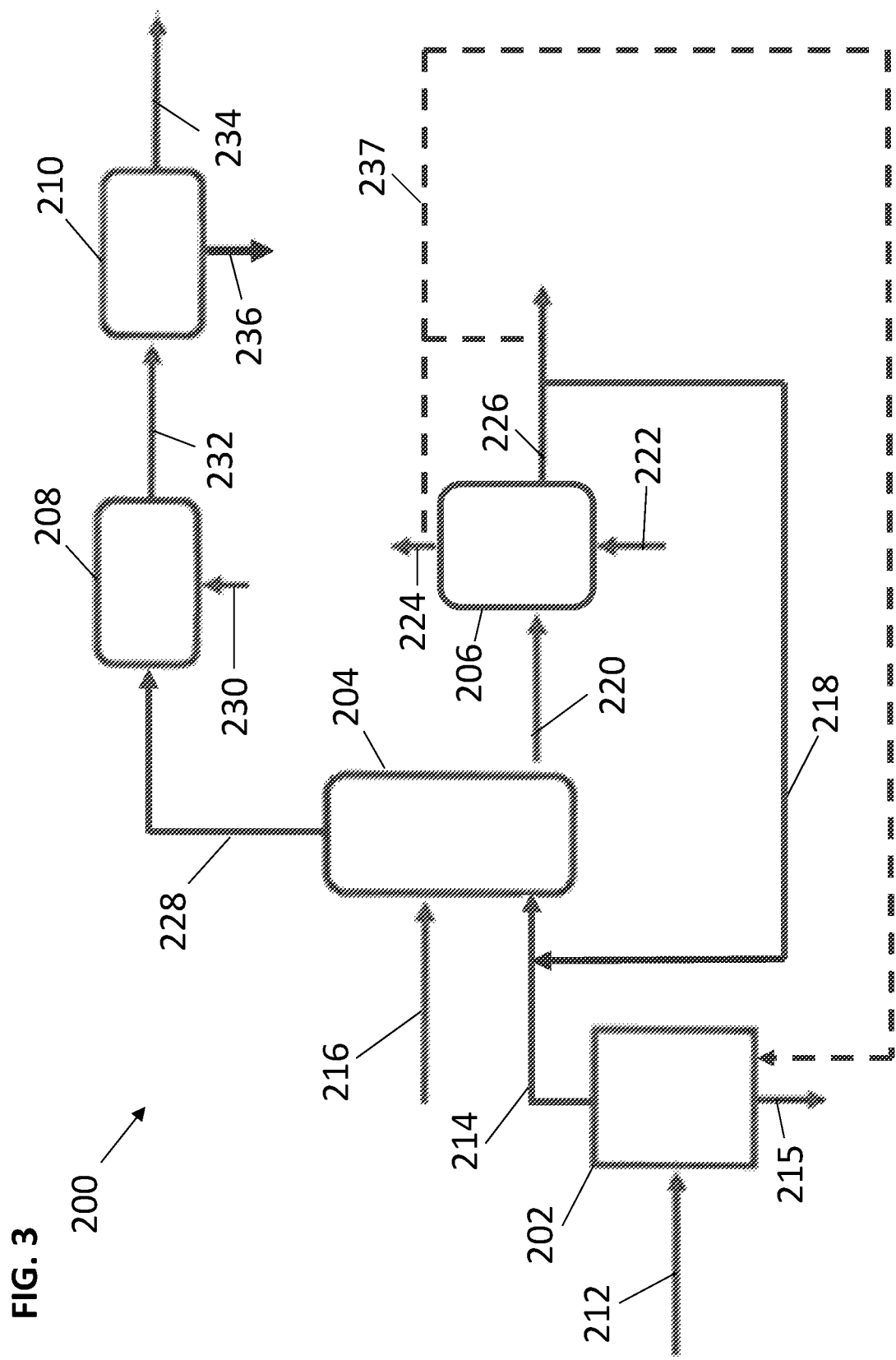
Figure 4:
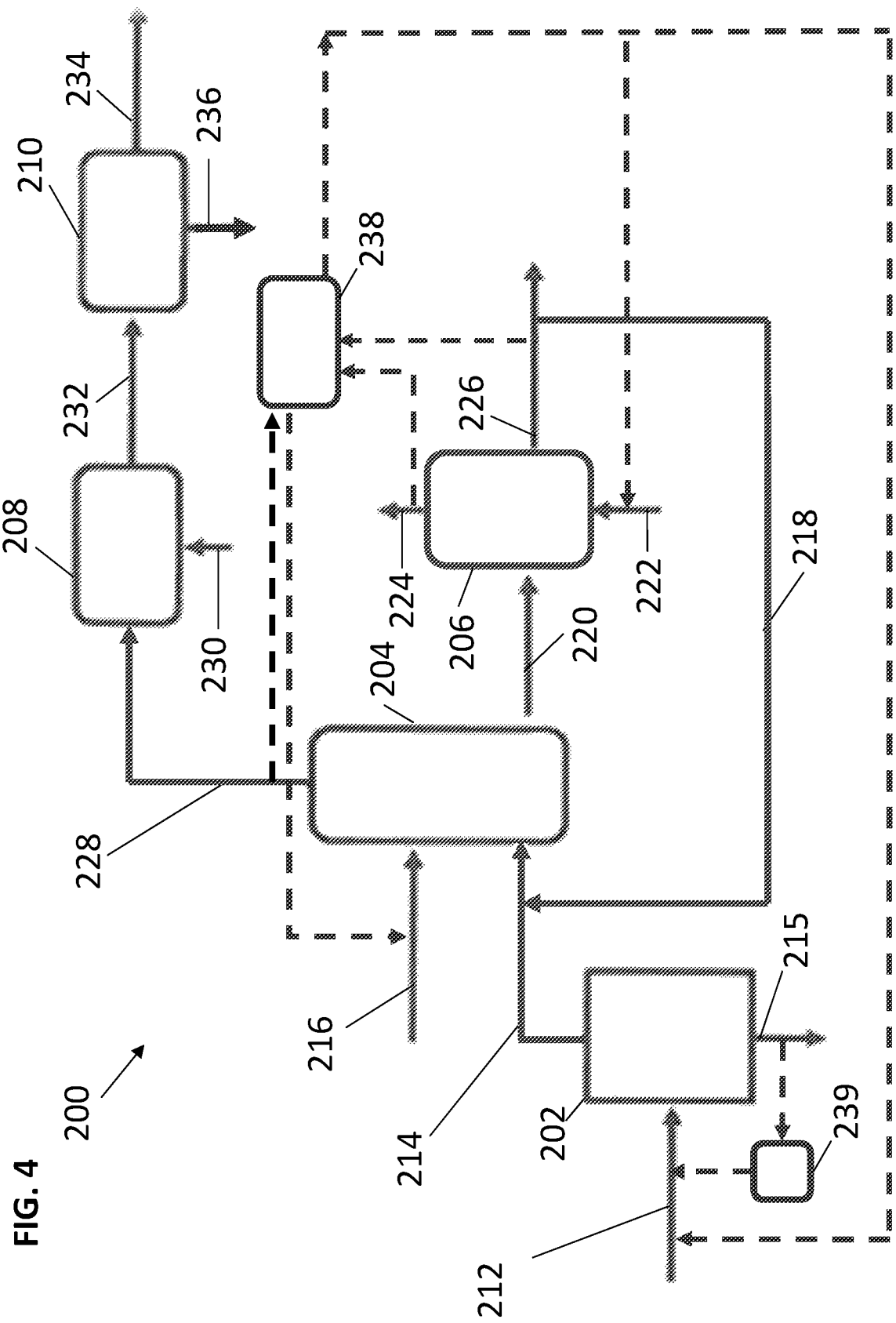
Figure 5:
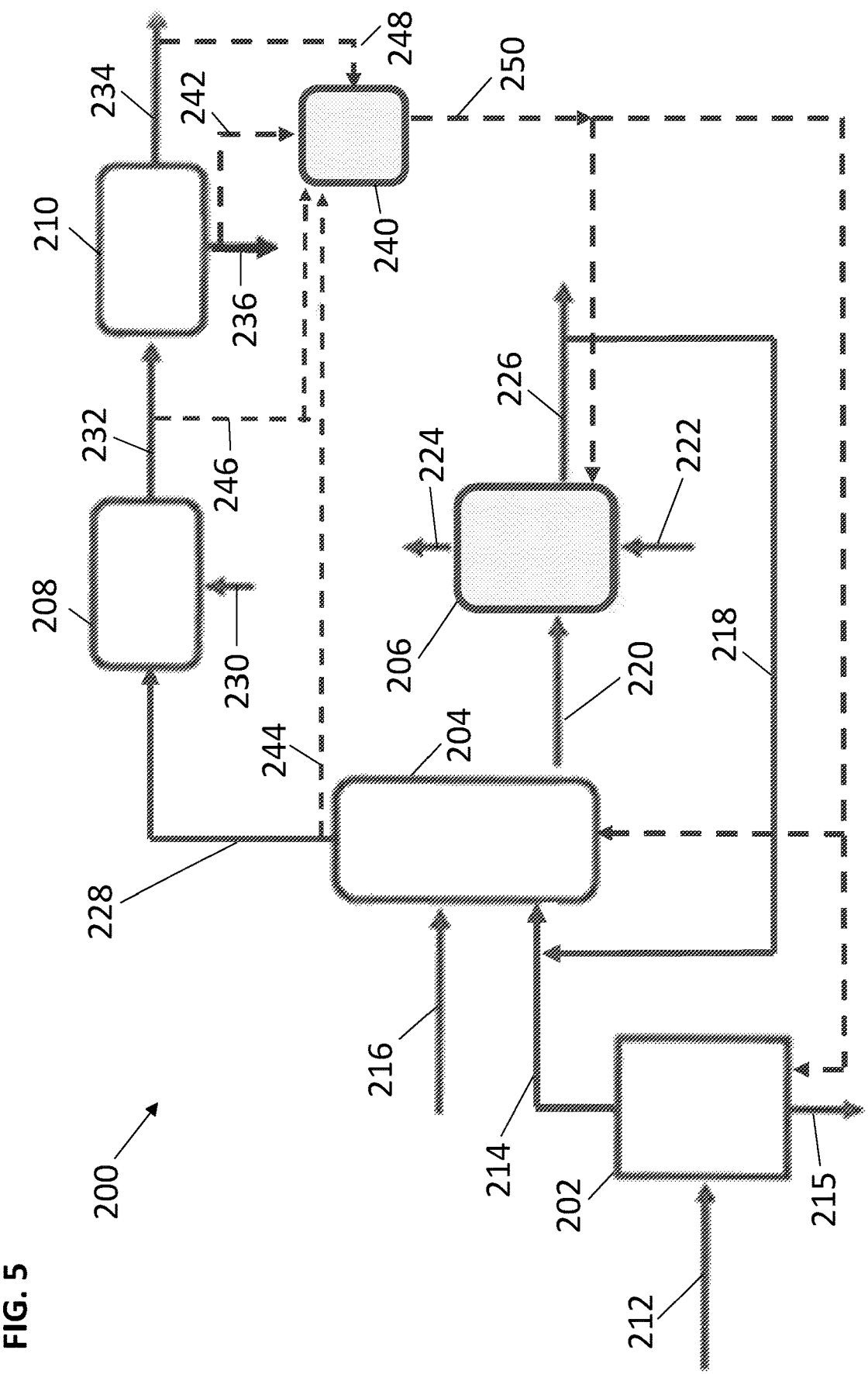

FIG. 1 displays a high-level diagram which illustrates a broad aspect of the method and system for hydrogen production via steam reforming of sour gas in accordance with one or more embodiments;

FIG. 2 displays a high-level diagram which illustrates a broad aspect of the method and system for hydrogen production via steam reforming of sour gas and additional combustion chambers in accordance with one or more embodiments FIG. 3 shows a high-level diagram of various aspects of the present method and system for hydrogen production via a calcium looping combustion scheme in accordance with one or more embodiments;

FIG. 4 shows a high-level diagram of various aspects of the present method and system for hydrogen production via a calcium looping combustion scheme and heat exchangers in accordance with one or more embodiments; and FIG. 5 shows a high-level diagram of various aspects of the present method and system for hydrogen production via a calcium looping combustion scheme and additional combustion chambers in accordance with one or more embodiments.

DETAILED DESCRIPTION OF CERTAIN EMBODIMENTS IN ACCORDANCE WITH THE DISCLOSURE

By way of overview and introduction, the present application discloses systems and methods for producing hydrogen from sour gas feeds. The present systems and methods enable efficient production of hydrogen from sour gas feeds. The present systems and methods also enable efficient desulfurization of the sour gas and avoids the need for Claus and SCOT units for sulfur capture.

In one or more embodiments, the present systems comprise a calcination reactor (calciner), a fuel reactor, an air reactor, a water gas shift reactor, and a purification stage. Calcium carbonate ($CaCO_3$) is injected into the calcination reactor, where it is decomposed under high heat to form calcium oxide (CaO) and carbon dioxide ($CO_2$). The present systems and methods can minimize $CO_2$ emissions resulting from the calcination of $CaCO_3$ as explained in further detail herein. The CaO solid stream is separated from the $CO_2$ gas stream and the CaO solid stream is fed to the fuel reactor. The fuel reactor further receives a sour gas stream and steam. In the fuel reactor, a steam reforming reaction occurs in which the CaO reacts with the $H_2S$ of the sour gas to form calcium sulfide (CaS) and water vapor. Further, the water vapor and the steam injected into the fuel reactor reforms the hydrocarbons present in the sour gas to form synthesis gas (syngas).

The syngas produced in the fuel reactor is fed to the water gas shift reactor (WGSR) stage where a water gas shift conversion occurs to form a shifted syngas product stream, which primarily comprises $H_2$ and $CO_2$. The shifted syngas stream is then provided to the purification stage, where the $H_2$ is separated from the $CO_2$ and other remaining components to form a substantially pure $H_2$ stream. The CaS formed in the fuel reactor is fed to the air reactor where it is oxidized. The oxidation reaction of CaS and air produces a $CaSO_4$ stream and an oxygen-lean air stream. In at least one embodiment, the oxygen-lean air stream produced in the air reactor can be fed to the calcination reactor to assist with the decomposition of $CaCO_3$ to CaO and $CO_2$.

In at least one embodiment, a combustion reaction occurs in the fuel reactor instead of a steam reforming reaction. In such an embodiment, the $CaSO_4$ formed in the air reactor can be recycled to the fuel reactor for further reactions and to provide addition energy to the fuel reactor.

These and other aspects of the present methods are described in further detail below with reference to the accompanied drawing figures, in which one or more illustrated embodiments and/or arrangements of the systems and methods are shown. The systems and methods of the present application are not limited in any way to the illustrated embodiment and/or arrangement. It should be understood that the systems and methods as shown in the accompanying figures are merely exemplary of the systems and methods of the present application, which can be embodied in various forms as appreciated by one skilled in the art. Therefore, it is to be understood that any structural and functional details disclosed herein are not to be interpreted as limiting the present systems and methods, but rather are provided as a representative embodiment and/or arrangement for teaching one skilled in the art one or more ways to implement the present systems and methods. Finally, it should be understood that, as used in the present application, the term "approximately" when used in conjunction with a number refers to any number within 5% of the referenced number, including the referenced number.

FIG. 1 displays a high-level diagram which illustrates a system 100 for hydrogen production via steam reforming of sour gas in accordance with one or more embodiments. The system 100 includes several units including a calcination reactor (calciner) 102, a fuel reactor 104, an air reactor 106, a water gas shift reactor 108, and a purification stage 110. It should be understood that these units are fluidly connected to one another as shown and described herein via conduits such as pipes. It is also noted that the reactions that occur in the calcination reactor 102 and the fuel reactor 104 are endothermic reactions while the reactions that occur in the air reactor 106 are exothermic reactions.

In the system 100, calcium carbonate ($CaCO_3$) is injected into the calcination reactor 102 via conduit 112. In the calcination reactor 102, the $CaCO_3$ is decomposed under high temperature conditions to form a calcium oxide (CaO) solid stream and a carbon dioxide ($CO_2$) gas stream. In one or more embodiments, the calcination reactor 102 is operated at a temperature greater than approximately 850° C. In one or more embodiments, the calcinatory reactor 102 is operated in a pressure range of approximately 1 bar to 10 bar. In at least one embodiment, the calcinatory reactor 102 is operated at a pressure of approximately 2 bar. The resulting CaO solid stream is separated from the $CO_2$ gas stream via a solid-gas separation device operatively connected to the calcination reactor 102, such as a cyclone (not shown). The separated CaO solid stream is then conveyed to the fuel reactor 104 via conduit 114. The separated $CO_2$ stream exits the calcination reactor 102 via conduit 115.

The fuel reactor 104 also receives a sour gas stream via conduit 116 and steam via conduit 118. The sour gas stream typically includes natural gas compounds, such as hydrocarbons, and can further include $CO_2$, nitrogen ($N_2$), $H_2S$. The ratio between hydrocarbons, $CO_2$, nitrogen ($N_2$), and $H_2S$ can vary depending on the particular sour gas feed source. For instance, in one or more embodiments, the $H_2S$ content of the sour gas can vary between approximately 0.1% and 90%. In at least one embodiment, the $H_2S$ content of the sour gas can vary between approximately 1% and 30%.

In one or more embodiments, the fuel reactor 104 can be a fluidized bed reactor or other types of bed reactors. In the fuel reactor 104, a steam reforming reaction occurs in which the CaO reacts with $H_2S$ present in the sour gas stream to form a calcium sulfide (CaS) solid stream and water vapor. In one or more embodiments, the fuel reactor is operated in a temperature range of approximately 550° C. to 900° C. In one or more embodiments, the fuel reactor 104 can be operated in pressure range of approximately 2 bar to 40 bar. In at least one embodiment, the fuel reactor 104 can be operated in a pressure range of approximately 10 bar to 20 bar. As such, in the fuel reactor 104, the sour gas is desulfurized via the reaction with CaO at a temperature range favorable for steam reforming. In other words, the temperature range of the fuel reactor 104 is favorable for both desulfurization and steam reforming reactions, thereby providing synergy between the desulfurization and reforming steps of the process. In contrast, conventional gas sweeting processes, in which the $CO_2$ and $H_2S$ of sour gas are separated using solvent treatment, are operated at lower temperatures than favorable steam reforming temperatures. Further, the steam reforming of the sour gas and the desulfurization of the sour gas (sulfur captured in the form of CaS) is done in the same fuel reactor in one step. The water vapor along with the steam injected via conduit 118 further react to reform hydrocarbons present in the sour gas, and thereby form syngas. The syngas is primarily composed of $H_2$ and carbon monoxide (CO).

The CaS solid stream can be separated from the water vapor and the remaining gases in the fuel reactor by way of a solid-gas separation device operatively connected to the fuel reactor, such as a cyclone (not shown). In one or more embodiments, the separated CaS solid stream is then fed to the air reactor 106 via conduit 120, where it is oxidized by an air stream. In one or more embodiments, the air reactor 106 can be a fast riser transport reactor or other types of air reactors. In one or more embodiments, the air reactor can be operated in a temperature range between approximately 650° C. and 1400° C.

The air stream can enter the air reactor 106 via conduit 122. The oxidation reaction of CaS and air produces a calcium sulfate ($CaSO_4$) solid stream and an oxygen-lean air stream. In one or more embodiments, the $CaSO_4$ solid stream and the oxygen-lean air stream can be separated via a solid-gas separation device operatively connected to the air reactor 106, such as a cyclone (not shown). In one or more embodiments, the separated oxygen-lean air stream can exit the air reactor 106 via conduit 124 and the separated $CaSO_4$ solid stream can exit the air reactor 106 via conduit 126. As such, the air reactor 106 allows the sulfur from the sour gas to ultimately be captured in the form of $CaSO_4$. In at least one embodiment, the separated $CaSO_4$ solid stream can be used utilized in other operations, including operations for cement production.

The syngas produced in the fuel reactor 104 is passed from the fuel reactor 104 to the water gas shift reactor (WGSR) stage 108 via conduit 128. Steam is also injected into the WGSR stage 108 via conduit 130. In one or more embodiments, the WGSR stage 108 can consist of two in-series adiabatic reactors. The adiabatic reactors can have pre-stage and inter-stage cooling, and the in-series adiabatic reactors can be operated in a temperature range of approximately 150° C. to 400° C. In the WGSR stage 108, a water gas shift conversion occurs in which carbon monoxide (CO) present in the syngas reacts with the injected steam to form a shifted syngas product stream primarily comprising $H_2$ and $CO_2$.

The shifted syngas stream is then passed from the WGSR stage 108 to a purification stage 110 via conduit 132. In the purification stage 110, the $H_2$ of the shifted syngas stream is separated from the $CO_2$ and any other remaining components of the shifted syngas stream. As such, a substantially pure $H_2$ stream is formed. In one or more embodiments, the purification stage 110 can separate the $H_2$ from the remaining syngas components via pressure swing adsorption (PSA) processes. In one or more embodiments, the purification stage 110 can operate at approximately ambient or near-ambient temperatures. In at least one embodiment, the purification stage 110 can operate in a temperature range of approximately 20° C. to 25° C. The substantially pure $H_2$ stream exits the purification stage 110 via conduit 134. The remaining components that were separated from the $H_2$ in the purification stage 110 make up a waste gas stream. In one or more embodiments, the waste gas stream exits the purification stage 110 via conduit 136. In one or more embodiments, the waste gas stream can comprise $CO_2$, unreacted hydrocarbons, remaining $H_2$, and other syngas components.

In at least one embodiment, the oxygen lean air stream formed in the air reactor 106 can be fed to the calcination reactor 102 via conduit 137. In such an embodiment, the oxygen lean air stream can help with the calcination reaction of $CaCO_3$. In this embodiment, the formed $CO_2$ stream in the calcination reactor 102 will be diluted mainly with nitrogen gas ($N_2$).

In at least one embodiment, the energy demands of the calcination reactor 102 and the fuel reactor 104 are met, at least in part, using one or more additional combustion chambers that are operatively connected to one or both of the calcination reactor 102 and the fuel reactor 104. For example, the fuel for the additional combustion chamber(s) can include one or more of the waste gas stream from the purification stage 110, a partial stream drawn from the syngas stream from the fuel reactor 104, and a partial stream drawn from shifted syngas stream from the WGSR stage 108. In at least one embodiment, energy for the calcination reactor 102 and the fuel reactor 104 can also be provided from the combustion of part of the CaS generated in the fuel reactor via additional combustion chambers. The CaS can be combusted in one or more separate combustion chambers.

For example, FIG. 2 displays an exemplary embodiment of system 100 in which one or more combustion chambers 140 are operatively connected to at least of the calcination reactor 102 and the fuel reactor 104 to help meet the energy demands of the calcination reactor 102 and the fuel reactor 104. As shown in FIG. 2, a portion of one or more of the waste gas stream (via conduit 142), the syngas stream (via conduit 144), the shifted syngas stream (via conduit 146), and the CaS stream (via conduit 148) can be passed to the combustion chamber(s) 140 and used as fuel in a combustion reaction. The heat generated from the combustion chamber(s) 140 can be used to provide energy to the calcination reactor 102 and/or the fuel reactor 104 via conduit 150.

As such, in at least one embodiment, the heat content of one or more of the waste gas stream, the syngas stream, the shifted syngas stream, and the heat generated from the combustion of CaS may be used to heat up the $CaCO_3$ feed and the sour gas feed to the calcination reactor 102 and fuel reactor 104, respectively. In particular, because the waste gas system can comprise $CO_2$ produced from the system 100, the use of the waste gas stream as a supplement to the energy demands of the calcination reactor 102 and fuel reactor 104 minimizes the $CO_2$ emissions of the system. Further, the excess heat from the additional combustion may be used to raise up steam for power and utility purposes to optimize the process. This use of the excess heat improves the thermal efficiency of the process, and include steam generation, which can be used in steam turbines for producing power or other energy needs.

In one or more embodiments, the waste gas stream from the purification stage 110 can be subsequently fed to a gas processing unit (not shown) to capture $CO_2$ at a desired purity that can be used for storage or utilization.

FIG. 3 displays a high-level diagram which illustrates a system 200 for hydrogen production via a calcium looping combustion scheme in accordance with one or more embodiments. Like the previously discussed system 100, the system 200 includes a calcination reactor (calciner) 202, a fuel reactor 204, an air reactor 206, a water gas shift reactor 208, and a purification stage 210. These units are fluidly connected to one another via conduits such as pipes as described herein.

In the system 200, calcium carbonate ($CaCO_3$) is injected into the calcination reactor 202 via conduit 212. In the calcination reactor 202, the $CaCO_3$ is decomposed under high heat to form a calcium oxide (CaO) solid stream and a carbon dioxide ($CO_2$) gas stream. In one or more embodiments, the calcination reactor 202 is operated at a temperature greater than 850° C. The resulting CaO solid stream formed in the calcination reactor 202 is separated from the $CO_2$ gas stream via a solid-gas separation device operatively connected to the calcination reactor 202 (e.g., cyclone, not shown). The separated CaO solid stream is then conveyed to the fuel reactor 204 via conduit 214. The separated $CO_2$ stream exits the calcination reactor 202 via conduit 215.

The fuel reactor 204 also receives a sour gas stream via conduit 216. Again, the ratio between the various components of the sour gas (e.g., hydrocarbons, $CO_2$, $N_2$, and $H_2S$) can vary depending on the particular sour gas feed. In one or more embodiments, the $H_2S$ content of the sour gas can vary between approximately 0.1% and 90%, or in at least one embodiment, can vary between approximately 1% and 30%.

The fuel reactor 204 can be a fluidized bed reactor or other types of bed reactors, for example. In the fuel reactor 204, a reduction reaction occurs in which the CaO reacts with $H_2S$ present in the sour gas stream to form a CaS solid stream and water vapor. In one or more embodiments, the fuel reactor 204 is operated in the temperature range of approximately 600° C. to 1300° C. In at least one embodiment, fuel reactor 204 is operated in the temperature range of approximately 750° C. to 1000° C. A stream of $CaSO_4$ is also injected into the fuel reactor. In one or more embodiments, the stream of $CaSO_4$ is provided from the air reactor 206 as discussed in further detail herein. The stream of $CaSO_4$ can be passed to fuel reactor via conduit 218. In one or more embodiments, conduit 218 can feed into conduit 214, which then directs the CaO from the calcination reactor 202 and the $CaSO_4$ from the air reactor 206 into the fuel reactor 204. In at least one embodiment, conduit 218 can directly inject the stream of $CaSO_4$ into the fuel reactor 204.

In the fuel reactor 204, the stream of $CaSO_4$ oxidizes the hydrocarbons present in the sour gas to form a syngas stream. By allowing for both the reaction of CaO with $H_2S$ to form CaS and the reaction of $CaSO_4$ with hydrocarbons to form a syngas stream, the fuel reactor 204 provides desulfurization of the sour gas feed at a temperature range favorable for the production of syngas. The syngas stream is primarily composed of $H_2$ and CO, as well as some entrained solids. The entrained solids are separated from the $H_2$ and CO gases via a gas-solid separation device operatively connected to the fuel reactor (e.g., cyclone). The separated solids can be fed back to the fuel reactor 204 or merged with the CaS solid stream. In one or more embodiments, the CaS solid stream can also be separated from the water vapor and the remaining gases in the fuel reactor by way of a solid-gas separation device operatively connected to the fuel reactor (e.g., cyclone).

In one or more embodiments, the separated CaS solid stream is then fed to the air reactor 206 via conduit 220, where it is oxidized by an air stream. The air reactor 206 can be a fast riser transport reactor, for example. The air stream can enter the air reactor 206 via conduit 222. The oxidation reaction of CaS and air produces a calcium sulfate ($CaSO_4$) solid stream and an oxygen-lean air stream. In one or more embodiments, the $CaSO_4$ solid stream and the oxygen-lean air stream can be separated via a solid-gas separation device operatively connected to the air reactor 206, such as a cyclone (not shown). In one or more embodiments, the air reactor can be operated in a temperature range between approximately 650° C. and 1400° C. In at least one embodiment, the air reactor can be operated in a temperature range between approximately 800° C. and 1200° C. In one or more embodiments, the separated oxygen-lean air stream can exit the air reactor 206 via conduit 224 and the separated $CaSO_4$ solid stream can exit the air reactor 206 via conduit 226.

In one or more embodiments, the oxygen-lean air stream exiting the air reactor 206 via conduit 224 can have an indirect thermal linkage with the calciner 202 as discussed in further detail below. The indirect thermal linkage can provide at least a portion of the energy required to drive the calcination reaction in the calciner 202. The indirect thermal linkage can include a built-in heat exchanger in calciner 202, for example. Alternatively, the indirect thermal linkage can include a heat loop recovering high-temperature energy from oxygen-lean air stream and transferring it to the lower temperature calciner 202. In at least one embodiment, the indirect thermal linkage can be accomplished via other means known in the art.

For example, in at least one embodiment, the oxygen-lean air stream exiting the air reactor 206 via conduit 224 is in thermal linkage with the calciner 202 and exchanges heat directly with the calciner 202. In such an embodiment, the oxygen-lean air stream exiting the air reactor 206 via conduit 224 is fed to the calciner 202 alone or with the $CaSO_4$ solid stream in conduit 218 to assist with the decomposition of $CaCO_3$ in the calciner 202. As shown in FIG. 3, in at least one embodiment the oxygen-lean air stream alone or in combination with the $CaSO_4$ solid stream can be fed to the calciner 202 via conduit 237. In this embodiment, the $CO_2$ stream exiting the calciner 202 following the calcination reaction is diluted, primarily with $N_2$. Further, in at least one embodiment, the $CO_2$ exiting the calciner 202 can be captured via a suitable $CO_2$ capture technology.

In one or more embodiments, as shown in FIG. 3, at least a portion of the separated $CaSO_4$ solid stream exiting via conduit 226 can be recycled to the fuel reactor 204. Specifically, conduit 226 can be in fluid connection with conduit 218. As such, at least a portion of the $CaSO_4$ solid stream in conduit 226 can be passed to conduit 218, and thereby recycled to the fuel reactor 204 directly or via conduit 214. It is noted that the reaction that occur in the fuel reactor 204 and the calcination reactor 202 are endothermic reactions while the reactions that occur in the air reactor 206 are exothermic reactions. As such, in at least one embodiment, the $CaSO_4$ solid stream recycled via conduit 218 can provide the necessary heat required by fuel reactor 204 to run the reactions in the fuel reactor 204.

In at least one embodiment, the $CaSO_4$ solid stream in conduit 218 can be fed to the calciner 202 rather than the fuel reactor 204 in order to provide the necessary heat to drive the calcination reaction. In such an embodiment, a mixture stream of CaO and $CaSO_4$ exits the calciner 202 via conduit 214 and is then fed to the fuel reactor 204. In at one embodiment, the $CaSO_4$ solid stream in conduit 218 can be divided into two streams: one feeding the calciner 202 and the other feeding the fuel reactor 204, which allows for better heat management between the calcination and fuel reactors. Again, in this embodiment, the resultant CaO/$CaSO_4$ stream exiting the calciner 202 via conduit 214 can be fed to the fuel reactor 204.

With continued reference to FIG. 3, the syngas produced in the fuel reactor 204 is passed from the fuel reactor 204 to the water gas shift reactor (WGSR) stage 208 via conduit 228. Steam is also injected into the WGSR stage 108 via conduit 230. In one or more embodiments, the WGSR stage 208 can consist of two in-series adiabatic reactors. The adiabatic reactors can have pre-stage and inter-stage cooling, and the reactors can be operated in a temperature range of approximately 150° C. to 400° C. In the WGSR stage 208, a water gas shift conversion occurs in which CO present in the syngas reacts with the injected steam to form a shifted syngas product stream primarily comprising $H_2$ and $CO_2$.

The shifted syngas stream is then passed from the WGSR stage 208 to a purification stage 210 via conduit 232. In the purification stage 210, the $H_2$ of the shifted syngas stream is separated from the $CO_2$ and any other remaining components of the shifted syngas stream to form a substantially pure $H_2$ stream. In one or more embodiments, the purification stage 210 can separate the $H_2$ from the remaining syngas components via pressure swing adsorption (PSA) processes. In one or more embodiments, the purification stage 210 can operate at approximately ambient or near-ambient temperatures. The substantially pure $H_2$ stream exits the purification stage 210 via conduit 234. The remaining components that were separated from the $H_2$ in the purification stage 210 make up a waste gas stream. In one or more embodiments, the waste gas stream exits the purification stage 210 via conduit 236. In one or more embodiments, the waste gas stream can comprise $CO_2$, unreacted hydrocarbons, remaining $H_2$, and other syngas components.

In one or more embodiments, the waste gas stream exiting the purification stage 210 via conduit 236 can fed to a downstream $CO_2$ capture system, which utilizes absorption methods, adsorption methods, or other $CO_2$ capture methods.

In one or more embodiments, heat recovered from various streams in the system 200 can be recycled to other components of the system 200 for improved energy efficiency. For example, FIG. 4 shows an embodiment of system 200 in which one or more heat exchangers can be used to recover heat from various streams and recycle it to other components of the system. For example, the syngas stream exiting the fuel reactor 204 via conduit 228 exits at high temperature and can be cooled down to the operating temperature of WGSR stage 208. During the cooling of the syngas stream, in one or more embodiments the heat can be recovered from syngas stream via one or more heat exchangers 238. The recovered heat can be used to provide heat to one or both of i) the calciner 202 by pre-heating inlet stream of $CaCO_3$ entering the calciner 202 via conduit 212 and ii) the air reactor 206 by pre-heating the air stream 302 entering the air reactor via conduit 222. Similarly, the $CO_2$ stream exiting the calciner 202 can exit at a high temperature. In at least one embodiment, the $CO_2$ stream from the calciner 202 can be cooled to near ambient temperature, and the heat can be recovered via heat exchanger 239. The recovered heat from the $CO_2$ stream can then be used to pre-heat the inlet stream of $CaCO_3$ entering the calciner 202 via conduit 212 and/or pre-heat the air stream entering the air reactor 206 via conduit 222. As such, the heat exchangers 238 and 239 can provide thermal linkages between the various components of the system 200.

Likewise, in one or more embodiments as exemplified in FIG. 4, heat can be recovered from the oxygen-lean air stream exiting the air reactor 206 at a high temperature via conduit 224. Specifically, the oxygen-lean air stream can be cooled to ambient temperature. The heat of the oxygen-lean air stream can be recovered via heat exchanger 238 and used to pre-heat the inlet stream of $CaCO_3$ entering the calciner 202 and/or pre-heat the air stream entering the air reactor 206.

In at least one embodiment, the solid stream of CaSO4 exiting the air reactor via conduit 226 is cooled and its heat is recovered by heat exchanger 238. More specifically, the heat recovered from the solid stream of $CaSO_4$ can be used to pre-heat the sour gas feed entering the fuel reactor 204 via conduit 216 and/or to pre-heat the air stream entering the air reactor 206. As such, in various embodiments, heat can be recovered and recycled throughout the system to meet the energy demands of the various reactors. It should be understood that in one or more embodiments, one or multiple heat exchangers can be used to recover and recycle heat throughout the system 200. As such, the location and number of heat exchangers shown in FIG. 4 are exemplary, as the heat exchanger(s) can be arranged in various ways as would be understood by a person skilled in the art. For example, in instances in which there is heat exchanged between multiple gas streams, the heat exchanger can be an indirect heat exchanger (no direct contact between the gas streams). In instances in which the is heat exchanged between a solid stream and gas stream, the heat exchanger can be a direct heat exchanger (direct contact between the solid stream and the gas stream). A solid-gas separator can be included downstream of the direct heat exchanger for separation of the resulting solid-gas mixture.

The energy demand of the fuel reactor 204 can be partially met by the oxidation of syngas with CaSO4. In one or more embodiments, the remaining energy requirements of fuel reactor 204 as well as the calcination reactor 202 can be met in different means. For example, in one or more embodiments, the circulation of $CaSO_4$ from the air reactor 206 back to the fuel reactor 204 via conduits 226 and 218 can help to meet the energy demands of the fuel reactor.

In at least one embodiment, as exemplified in FIG. 5, one or more of the calcination reactor 202, the fuel reactor 204, and the air reactor 206 can be linked to one or more combustion chambers 240 in which fuel is supplied and oxidized/combusted. The fuel used in these additional combustion chambers 240 can be one or more of the waste gas stream (via conduit 242), partial streams drawn from the syngas stream (via conduit 244) and the shifted syngas stream (via conduit 246) and the hydrogen product stream (via conduit 248). The heat generated from the combustion chamber(s) 240 can be used to provide energy to the calcination reactor 202, the fuel reactor 204, and/or the air reactor 206 via conduit 250. In embodiments in which CO2 capture is needed, it is preferable to use the hydrogen product stream as the fuel to supply the required heat to the reactors.

The additional combustion chamber(s) 240 can be operatively connected to one or both of the calcination reactor 202 and the fuel reactor 204, and thereby help to meet the energy demand of these reactors. In at least one embodiment, both circulation of $CaSO_4$ from the air reactor 206 back to the fuel reactor 204 and the additional combustion chamber(s) can be utilized to meet the energy demands of the reactors, while minimizing fuel usage. The integration of one or more additional combustion chambers can provide the required energy for the calcination reactor 202 and/or fuel reactor 204. For example, the $CaCO_3$ and/or CaO from the calcination reactor 202 can exchange heat directly with the combustion products and carry the energy required for a subsequent reaction or for the calcination or reduction reactions. In at least one embodiment, heat/energy can be recovered for a secondary combustor by pre-heating the sour gas prior to introduction into the fuel reactor 204, pre-heating the air prior to introduction into the oxidation reactor, and/or pre-heating steam generated for the WGSR stage 208.

In one or more embodiments, excess energy from the various streams can be used to generate steam that can be used as is in an adjacent process or for fluidization or that could be used to generate power. These streams can include at least one of the CaS stream (conduit 220), the CaSO4 stream (conduit 226), the CO2 stream (conduit 215), and the shifted syngas stream (conduit 232).

Accordingly, the present systems and methods integrates sulfur capture processes and hydrogen generation processes, thereby decreasing the number of unit operations and thus reducing the cost of hydrogen production. Further, the present systems and methods also provide hydrogen production using sour gas feeds without the need for sour gas sweetening. The present systems and methods can be further integrated with $CO_2$ capture technologies for $CO_2$ formed in the calcination reactor and $CO_2$ present in the waste gas streams. As such, the present systems and methods provide economical and efficient options for producing hydrogen from sour gas feeds, while meeting increasing standards for sulfur and $CO_2$ emissions.

Although much of the foregoing description has been directed to systems and methods for hydrogen production from sour gas feeds, the system and methods disclosed herein can be similarly deployed and/or implemented in scenarios, situations, and settings far beyond the referenced scenarios. It should be further understood that any such implementation and/or deployment is within the scope of the system and methods described herein.

It is to be further understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Notably, the figures and examples above are not meant to limit the scope of the present disclosure to a single implementation, as other implementations are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s) (including the contents of the documents cited and incorporated by reference herein), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings are shown accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method for steam reforming of sour gas for hydrogen production, the method comprising:
    decomposing a calcium carbonate feed in a calcination reactor to form calcium oxide and carbon dioxide;
    separating the calcium oxide from the carbon dioxide via a first separation device;
    conveying the calcium oxide, a sour gas stream, and steam into a fuel reactor, wherein hydrocarbons present in the sour gas stream are reformed into synthesis gas and the calcium oxide reacts with hydrogen sulfide present in the sour gas stream to form calcium sulfide and water vapor;
    separating the calcium sulfide from the water vapor via a second separation device;
    conveying the calcium sulfide to an air reactor;
    oxidizing the calcium sulfide in the air reactor to produce an oxygen lean air stream and calcium sulfate;
    passing the synthesis gas to a water gas shift reaction stage, wherein at least a portion of the synthesis gas is converted to a shifted synthesis gas stream; and
    purifying the shifted synthesis gas stream to produce a hydrogen product stream and a waste gas stream.

2. The method of claim 1, wherein the calcination reactor is operated at a temperature greater than 850° C.

3. The method of claim 1, wherein the fuel reactor is operated in a temperature range of approximately 550° C. to 900° C.

4. The method of claim 1, wherein the air reactor is operated in a temperature range of approximately 650° C. and 1400° C.

5. The method of claim 1, wherein the water gas shift reaction stage comprises two in-series adiabatic reactors with pre-stage and inter-stage cooling, and wherein the in-series adiabatic reactors are operated in a temperature range of approximately 150° C. to 400° C.

6. The method of claim 1, wherein the waste gas stream comprises unreacted hydrocarbons, carbon dioxide, and hydrogen.

7. The method of claim 6, further comprising:
    combusting at least one of i) a portion of the waste gas stream, ii) a portion of the synthesis gas stream, and iii) a portion of the shifted synthesis gas stream in one or more combustion chambers, wherein heat produced by the one or more combustion chambers is used to heat at least one of the calcium carbonate feed and the sour gas stream prior to entering the calcination reactor and the fuel reactor, respectively.

8. The method of claim 1, further comprising:
    passing the waste gas stream to a gas processing unit, wherein carbon dioxide present in the waste gas stream is removed.

9. The method of claim 1, further comprising:
    conveying the oxygen lean air stream to the calcination reactor, wherein the lean air stream enhances decomposition of the calcium carbonate.

10. A system for steam reforming sour gas for hydrogen production, the system comprising:
    a calcination reactor configured to decompose calcium carbonate to form a calcium oxide stream and a carbon dioxide stream;
    a first separation device in fluid communication with the calcination device, the first separation device being configured to separate the calcium oxide stream from the carbon dioxide stream;
    a fuel reactor in fluid connection with the calcination reactor and into which sour gas and the calcium oxide stream are received, the fuel reactor being configured to reform hydrocarbons present in the sour gas into a synthesis gas stream and to react the calcium oxide stream with hydrogen sulfide present in the sour gas to form calcium sulfide and water vapor;
    a second separation device in fluid communication with the fuel reactor, the second separation device being configured to separate the calcium sulfide from the water vapor;
    an air reactor in fluid communication with the fuel reactor and into which calcium sulfide and an air stream are introduced, the air reactor being configured to oxidize the calcium sulfide via a reaction with the air stream to form an oxygen lean air stream and calcium sulfate;
    a water gas shift reaction stage in fluid communication with the fuel reactor and into which the synthesis gas stream and steam are introduced, the shift reaction stage being configured to convert at least a portion of the synthesis gas stream into a shifted synthesis gas stream; and
    a separation stage in fluid communication with the shift reaction stage and into which the shifted synthesis gas stream is introduced, the separation stage being configured to purify the shifted synthesis gas stream to form a hydrogen product stream and a waste gas stream.

11. The system of claim 10, wherein the calcination reactor is operated at a temperature greater than 850° C.

12. The system of claim 10, wherein the shift reaction stage comprises two in-series adiabatic reactors with pre-stage and inter-stage cooling, and wherein the in-series adiabatic reactors are operated in a temperature range of approximately 150° C. to approximately 400° C.

13. The system of claim 10, wherein the fuel reactor is operated in a temperature range of approximately 550° C. to 900° C.

14. The system of claim 10, wherein the air reactor is operated in a temperature range of approximately 650° C. and 1400° C.

15. The system of claim 10, further comprising:
    one or more combustion chambers in fluid communication with the shift reaction stage and the separation stage, the one or more combustion chambers being configured to combust at least one of i) a portion of the waste gas stream, ii) a portion of the synthesis gas stream, and iii) a portion of the shifted synthesis gas stream and to transfer heat to at least one of the calcination reactor and the fuel reactor.

16. The system of claim 10, further comprising:
a gas processing unit in fluid communication with the separation stage, and into which the waste gas stream is introduced, the gas processing unit being configured to remove carbon dioxide from the waste gas stream.

17. The system of claim 10, wherein the calcination reactor is in fluid communication with the air reactor and configured to receive the oxygen lean air stream from the air reactor.

18. A calcium looping method for producing hydrogen from sour gas, the method comprising:
decomposing a calcium carbonate feed in a calcination reactor to form calcium oxide and carbon dioxide;
separating the calcium oxide from the carbon dioxide via a first separation device;
conveying the calcium oxide, a sour gas stream, and a stream of calcium sulfate into a fuel reactor, wherein hydrocarbons present in the sour gas stream are oxidized by the stream of calcium sulfate to form synthesis gas and the calcium oxide reacts with hydrogen sulfide present in the sour gas stream to form calcium sulfide and water vapor;
separating the calcium sulfide from the water vapor via a second separation device;
conveying the calcium sulfide to an air reactor;
oxidizing the calcium sulfide in the air reactor to produce an oxygen lean air stream and a calcium sulfate stream;
introducing at least a portion of the calcium sulfate stream formed in the air reactor into the fuel reactor;
passing the synthesis gas to a water gas shift reaction stage, wherein at least a portion of the synthesis gas is converted to a shifted synthesis gas stream; and
purifying the shifted synthesis gas stream to produce a hydrogen product stream and a waste gas stream.

19. The method of claim 18, wherein the calcination reactor is operated at a temperature greater than 850° C.

20. The method of claim 18, wherein the shift reaction stage comprises two in-series adiabatic reactors with pre-stage and inter-stage cooling, and wherein the in-series adiabatic reactors are operated in a temperature range of approximately 150° C. to approximately 400° C.

21. The method of claim 18, wherein the fuel reactor is operated in a temperature range of approximately 600° C. to 1300° C.

22. The method of claim 18, wherein the air reactor is operated in a temperature range of approximately 650° C. and 1400° C.

23. The method of claim 18, wherein the waste gas stream comprises unreacted hydrocarbons, carbon dioxide, and hydrogen.

24. The method of claim 23, further comprising:
combusting at least one of i) a portion of the waste gas stream, ii) a portion of the synthesis gas stream, iii) a portion of the shifted synthesis gas stream, and iv) a portion of the hydrogen product stream in one or more combustion chambers, wherein heat produced by the one or more combustion chambers is used to heat at least one of the calcium carbonate feed and the sour gas stream prior to entering the calcination reactor and the fuel reactor, respectively.

25. The method of claim 23, further comprising:
passing the waste gas stream to a gas processing unit, wherein a carbon dioxide stream is removed from the waste gas stream.

26. The method of claim 18, further comprising:
heating the calcination reactor via a thermal linkage, wherein the thermal linkage recovers energy from the oxygen lean air stream and transfers the energy to the calcination reactor.

27. The method of claim 26, wherein the thermal linkage comprises a heat exchanger.

28. The method of claim 18, further comprising:
conveying the oxygen lean air stream to the calcination reactor, wherein the lean air stream enhances decomposition of the calcium carbonate.

29. A calcium looping system for producing hydrogen from sour gas, the system comprising:
a calcination reactor configured to decompose calcium carbonate to form a calcium oxide stream and a carbon dioxide stream;
a first separation device in fluid communication with the calcination device, the first separation device being configured to separate the calcium oxide stream from the carbon dioxide stream;
a fuel reactor in fluid connection the calcination reactor, and into which sour gas, calcium sulfate, and the calcium oxide stream are received, wherein hydrocarbons present in the sour gas are oxidized by the calcium sulfate to form a synthesis gas stream and wherein the calcium oxide reacts with hydrogen sulfide present in the sour gas to form calcium sulfide and water vapor;
a second separation device in fluid communication with the fuel reactor, the second separation device being configured to separate the calcium sulfide from the water vapor;
an air reactor in fluid communication with the fuel reactor, and into which calcium sulfide and an air stream are introduced, the air reactor being configured to oxidize the calcium sulfide via a reaction with the air stream to form an oxygen lean air stream and a calcium sulfate stream;
a water gas shift reaction stage in fluid communication with the fuel reactor and into which the synthesis gas stream and steam are introduced, the shift reaction stage being configured to convert at least a portion of the synthesis gas stream into a shifted synthesis gas stream via a catalytic water gas shift conversion; and
a separation stage in fluid communication with the shift reaction stage and into which the shifted synthesis gas stream is introduced, the separation stage being configured to purify the shifted synthesis gas stream to form a hydrogen product stream and a waste gas stream.

30. The system of claim 29, further comprising,
a conduit in fluid communication with the air reactor and the fuel reactor, wherein the conduit is configured to receive a portion of the calcium sulfate stream and introduce the portion of the calcium sulfate stream into the fuel reactor.

31. The system of claim 29, wherein the calcination reactor is operated at a temperature greater than 850° C.

32. The system of claim 29, wherein the shift reaction stage comprises two in-series adiabatic reactors with pre-stage and inter-stage cooling, and wherein the in-series adiabatic reactors are operated in a temperature range of approximately 150° C. to approximately 400° C.

33. The system of claim 29, further comprising:
one or more combustion chambers in fluid communication with the shift reaction stage and the separation stage, the one or more combustion chambers being configured to combust at least one of i) a portion of the waste gas stream, ii) a portion of the synthesis gas stream, iii) a portion of the shifted synthesis gas stream, and iv) a portion of the hydrogen product stream, and to transfer heat to at least one of the calcination reactor and the fuel reactor.

34. The system of claim 29, further comprising:
a gas processing unit in fluid communication with the separation stage, and into which the waste gas stream is introduced, the gas processing unit being configured to remove carbon dioxide from the waste gas stream.

35. The system of claim 29, further comprising:
a thermal linkage operatively connected to the calcination reactor, wherein the thermal linkage is configured to recover energy from the oxygen lean air stream and transfer the energy to the calcination reactor.

36. The system of claim 29, wherein the thermal linkage comprises a heat exchanger.

37. The system of claim 29, wherein the calcination reactor is in fluid communication with the air reactor and configured to receive the oxygen lean air stream from the air reactor.

38. The system of claim 29, wherein the fuel reactor is operated in a temperature range of approximately 600° C. to 1300° C.

39. The system of claim 29, wherein the air reactor is operated in a temperature range of approximately 650° C. and 1400° C.

* * * * *